Figure 1:
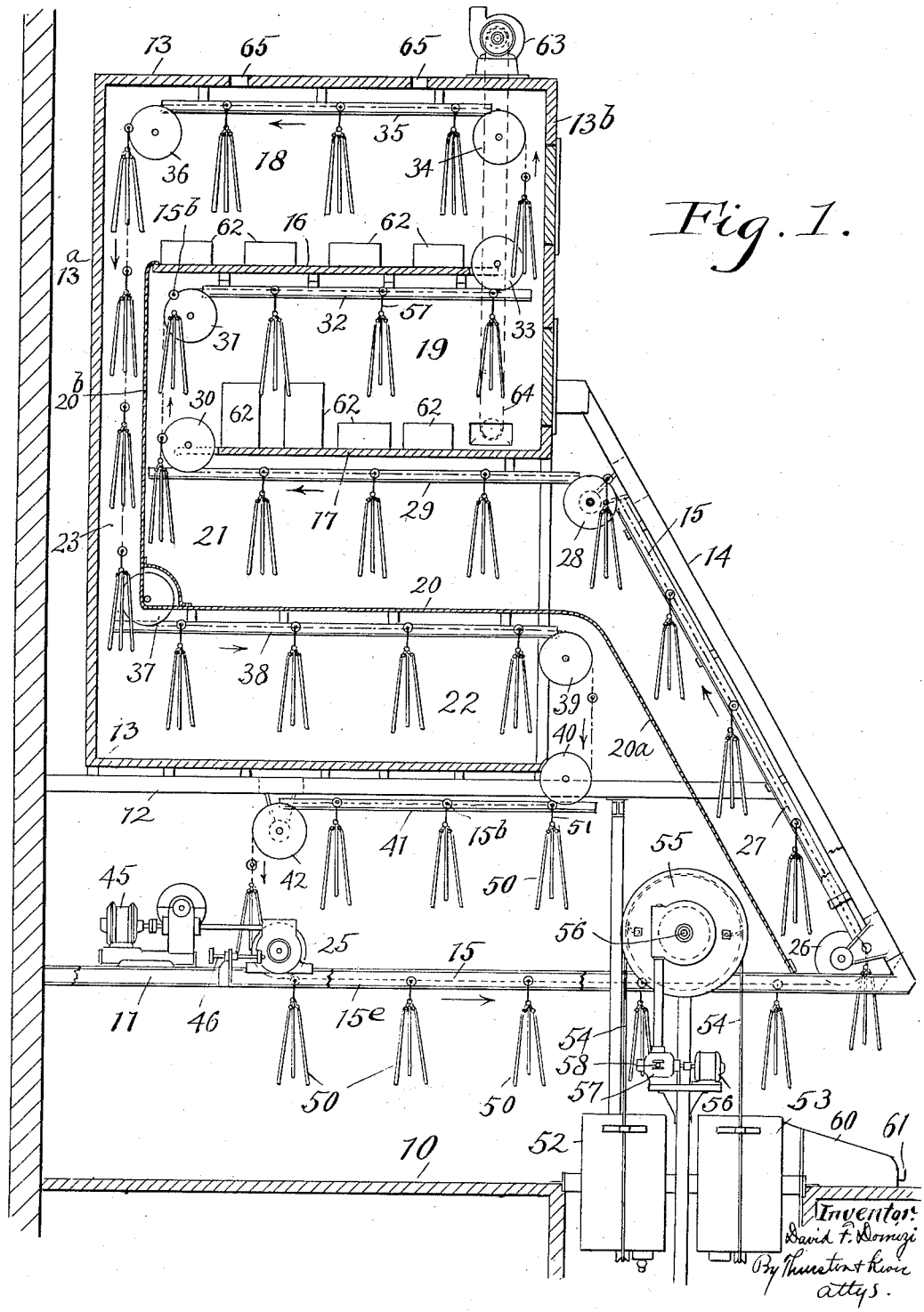

D. F. DOMIZI.
DRYING OVEN.
APPLICATION FILED JUNE 27, 1917.

1,381,974.

Patented June 21, 1921.
2 SHEETS—SHEET 1.

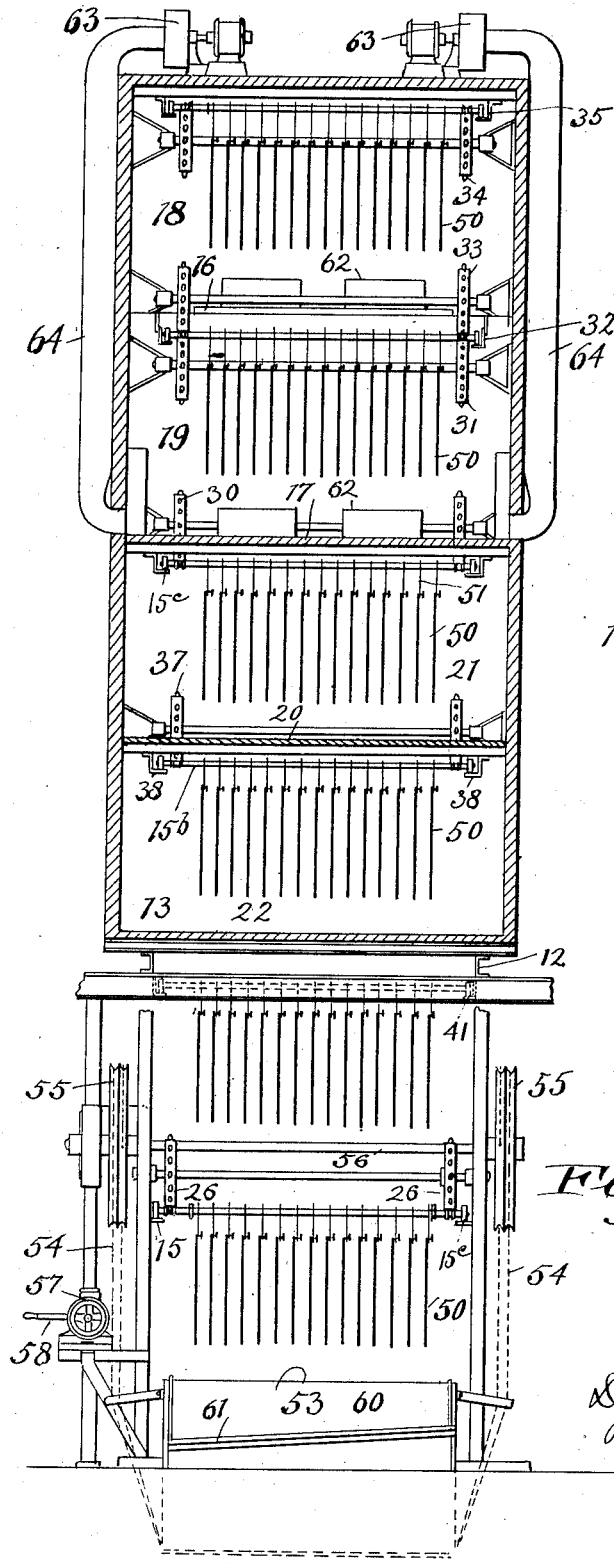
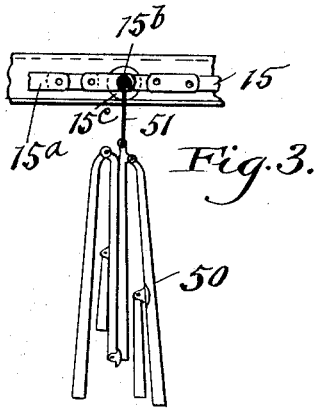
Fig. 3.
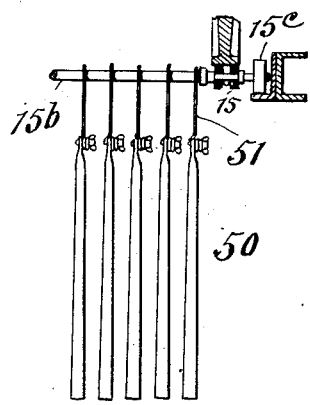
Fig. 4.
Fig. 2.

ately.
UNITED STATES PATENT OFFICE.

DAVID F. DOMIZI, OF CLEVELAND, OHIO.

DRYING-OVEN.

1,381,974. Specification of Letters Patent. Patented June 21, 1921.

Application filed June 27, 1917. Serial No. 177,188.

*To all whom it may concern:*

Be it known that I, DAVID F. DOMIZI, a citizen of the United States, residing at Cleveland, in the county of Cuyahoga and State of Ohio, have invented a certain new and useful Improvement in Drying-Ovens, of which the following is a full, clear, and exact description.

This invention relates to a japanning apparatus and has for its chief object to provide an apparatus of this character having high efficiency, large capacity and requiring a small amount of hand labor compared with devices or apparatus employed heretofore.

In a construction embodying the present invention, a long endless conveyer chain is provided for carrying the articles to be japanned and in connection therewith I provide apparatus for dipping or immersing the articles in the japan contained in one or a plurality of receptacles and in addition provide drip-receiving members and an oven arranged above a loading and unloading point, the whole operating in such a manner that while the conveyer is traveling continuously around or through its path or cycle of movement, the articles will be placed on or suspended from the conveyer, and as they pass along to the right and left and upwardly, they are immersed in the japan and then for a definite period carried along a portion of the apparatus which receives the excess solution which drips from the articles and then they are carried through superposed portions of the oven, which heats and bakes the japan on the articles, which then pass downward to the loading and unloading point, where they can be removed or allowed to again pass through the sinuous path of movement in the event they are to be given another coat, in which case they will be again immersed in the japan, preferably in a second receptacle.

The invention resides particularly in the general arrangement of parts whereby the dipping, dripping and heating take place successively and the latter to a gradually increasing extent, followed by a gradual cooling as the conveyer carries the articles back to the unloading point.

A further important feature resides in the specific way in which the articles are immersed or dipped in the japan, this being done in accordance with the present invention, by intermittently elevating a tank or receptacle containing the japan or solution, as the articles are conveyed by the conveyer along a line above the same, this feature having for its chief advantages that the extent and time of immersion can be varied to suit the exigencies of any particular case and without requiring any stopping or slowing of the conveyer, and admitting of the articles being given two or more coats with apparatus having great simplicity and occupying a small space compared with apparatus wherein the articles are required to pass downward into and then out of relatively stationary receptacles.

The invention may be further briefly summarized as consisting in certain novel details of construction and combinations and arrangements of parts which will be described in the specification and set forth in the appended claims.

In the accompanying sheets of drawings wherein I have shown the preferred embodiment of my invention, Figure 1 is a vertical sectional view through the apparatus, portions being shown in elevation; Fig. 2 is a vertical sectional view taken at right angles to the section of Fig. 1, the lower part of the apparatus being shown in elevation; and Figs. 3 and 4 are respectively a side and cross-sectional detail view of the conveyer, with the articles to be japanned suspended therefrom.

The japanning apparatus includes a lower loading and unloading platform 10, above which there is a framework of structural material, including horizontally disposed members 11 and 12, which constitute or support tracks for the endless conveyer, and above the frame members 12 is a rectangular-shaped chamber 13, which will be termed the oven. The frame members 11 and 12 are carried horizontally outward beyond and to the right of the oven as viewed in Fig. 1, and these members support inclined frame members 14, which support inclined track members and extend upwardly to about the middle of the front side of the oven.

It may be stated at this point that the endless conveyer designated 15, travels back and forth beneath the oven and back and forth several times at different elevations in the oven, the latter being divided into several superposed compartments, and including also certain vertical passageways for the vertical travel of the conveyer. The oven has two main transverse or horizontal partitions or platforms 16 and 17, which form the two main heating chambers 18 and 19. Additionally beneath the lower partition 17 there is a drip catcher 20 which extends substantially across the lower half of the oven forming two additional compartments 21 and 22. This drip catcher 20 has a front downwardly inclined drip receiving portion 20ª, which is a suitable distance beneath the inclined outer frame members 14 and it also includes a rear portion 20ᵇ extending upwardly from the horizontal portion up to the upper partition 16, forming next to the rear wall 13ª of the oven a vertical passageway 23, through which the articles supported by the conveyer are conveyed downwardly from the uppermost chamber 18 down to the lowermost chamber 22. The uppermost partition 16 extends from the vertical wall 20ᵇ toward but not entirely to the front wall 13ᵇ of the oven and the next lower partition 17 extends from the front wall 13ᵇ rearwardly toward but not entirely to the vertical wall 20ᵇ. The front wall of the oven beneath the partition or platform 17 is open for the ingress and egress of the conveyer and air. Thus it will be seen that the several compartments of the oven are more or less connected one with another and are so arranged that they provide a zigzag path for the conveyer The various tracks and supporting sprockets for the conveyer 15 will be described in the order in which the chain in its complete cycle of movement traverses over the same. Near the inner or rear ends of the lower frame members 11 are sprockets 25 and after rounding these sprockets the conveyer travels horizontally forward along the frame members 11 which are preferably in the form of channels. In traveling along these channels they pass over the loading and unloading platform 10 and over the dipping apparatus, which will be referred to presently. The conveyer then travels about sprockets 26 near the junction of the lower frame members 11 and the inclined frame members 14, then up along inclined tracks 27 parallel to the frame members 14, then around sprockets 28 near the upper ends of the inclined frame members 14, then horizontally inward over tracks 29 near the top of chamber 21, then upwardly from compartment 21 to compartment 19, around sprockets 30 and 31, then horizontally forward along tracks 32 in the upper part of compartment 19, then upwardly to the uppermost compartment 18 around sprockets 33 and 34, then horizontally rearward along tracks 35 near the top of compartment 18, then around sprockets 36 and downwardly adjacent the rear wall 13ª of the oven through the vertical passageway 23, then around sprockets 37 and forwardly along tracks 38 at the upper part of compartment 22, then around sprocket 39 and downwardly to and around sprocket 40, and then horizontally rearward along tracks 41 beneath the oven, then around sprockets 42 and downwardly to the before-mentioned sprockets 25.

The conveyer 15 consists of two chains 15ª connected together at intervals with cross rods or pipes 15ᵇ, to the ends of which are attached rollers 15ᶜ, which engage the several tracks previously described. The conveyer is driven slowly around the guiding and supporting sprockets and tracks above described, by a motor 45 (see Fig. 1) which is supported on the frame members 11 and which through suitable reduction gearing rotates the shaft provided with the sprockets 25. The conveyer will be driven at the rate of about one foot per minute but its speed can be varied as desired. By adjusting the sprocket wheels 25 together with the shaft supporting them, through adjusting mechanism indicated at 46 the chain can be tightened or loosened.

The articles which are to be japanned and which are carried by the conveyer are here shown as bow sockets adapted to be employed in the manufacture of tops for vehicles, these articles being designated 50. They are suspended from the cross bars 15ᵇ of the conveyer by hooks 51, each cross bar supporting a large number of sets of sockets as indicated particularly in Fig. 2.

As the articles to be japanned pass forwardly along the lower trackway 15ᵉ, they are coated by immersion in the japanning solution by means of apparatus which constitutes one of the important features of the invention. For this purpose I employ one or a plurality of vertically movable tanks or receptacles, two such tanks 52 and 53 being here shown. These tanks, the length of which is about the length of one of the cross bars of the conveyer, are raised, one at a time, so as to immerse the series or set of articles supported on the cross bar and then the tank is lowered, the articles being coated to the proper extent and being allowed to remain in the solution for the desired length of time, which is usually very short. This is done as each cross bar with the suspended articles arrives over the proper tank, without stopping or slowing the travel of the conveyer and without causing the conveyer to deviate from its straight line movement along the trackway 15ᵉ.

The two tanks here shown are employed when it is desired to give succeeding coats to the article, as the solutions for the first and second coats are usually of a different quality. The solution for the first coat will generally be in the first tank 52 and the solution for the second coat or for the second and third coats, as the case may be, will be in the second tank. In consequence, the first tank will be elevated each time a set of uncoated articles conveyed by the conveyer is above the same and if the articles are to be given a second coat they will travel the second time around the course and on the second trip they will be immersed in the second tank 52, which will be elevated and then lowered each time a set of articles is over the same. If the articles are to be given a third coat they will be allowed to travel the course three times and on the third trip will either be given a second immersion in the solution of tank 53, or if desired, a third vertically movable tank may be provided in the event it is desired that the third coat be applied by a solution having a different quality than that in the second receptacle.

In this case the two tanks are arranged so as to substantially counter-balance each other, one moving upward while the other moves downward. This is accomplished in this case by cables 54 which are attached to the ends of the tanks and extend upwardly part way about a pair of sheaves 55 (see Figs. 1 and 2) the cables from one tank passing about the peripheries of the sheaves in one direction and the cables attached to the other tank passing about the peripheries of the sheaves in the opposite direction. The sheaves 55 are secured to a cross shaft 56 which will be suitably supported in the frame work of the apparatus and this shaft is designed to be rotated a certain amount in one direction and then the other by a motor 56 (see Fig. 1) which through reversing gearing 57 properly connected to the shaft 56 and controlled by any suitable means such as a lever 58 (Fig. 2) will intermittently raise and lower the two tanks.

It will be understood of course, that it is not essential that the two tanks be connected together so as to operate in unison, nor that they be raised and lowered by the mechanism here shown as they may be raised and lowered in any other suitable manner.

Before describing the operation it may be well to mention that the compartments 18 and 19 of the oven are both heated, heat being applied in this instance, although not necessarily, by electrical heaters 62, which are arranged on the platforms 16 and 17 along the side walls of the two compartments 18 and 19. The temperature in the upper compartment will be considerably higher than that in compartment 19. For the ordinary japanning work the temperature in the uppermost compartment 18 will be about 450° Fahrenheit and the temperature in the compartment 19 about 250° Fahrenheit. The compartments 21 and 22 will also be heated to some extent by conduction and convection but to a considerably lower temperature than the temperature in the compartment 19, the lowermost compartment being of course the coolest.

In addition to the parts above described, the apparatus includes suitable ventilating means consisting in this case, of blowers 63 connected by pipes 64 (see Fig. 2) to the compartment 19. These blowers in addition to clearing the compartment of dangerous or explosive gases, create a flow of air which is desirable during the drying and baking process. The upper wall of the oven is also provided with ventilating openings 65.

In the use of this apparatus the conveyer will be started in operation and the articles will be placed on the cross bars by one or more workmen standing on the loading and unloading platform 10. As they pass along the lower trackway each set of articles will be immersed in the japanning solution by raising and then lowering the proper tank in the manner explained above, then the articles are carried diagonally upward and rearward along the inclined trackway 27 and in traveling along this inclined portion of the path the major portion of the excess solution on the immersed articles drips from the articles onto the inclined wall 20ᵃ. The solution falling on this inclined wall runs down the same onto a lower inclined wall or plate 60, from which it runs into a trough 61 and then into any suitable receptacle which will be provided for that purpose.

The articles are then carried rearward through the compartment 21 where they are heated to some extent and here due to the warming of the solution on the articles, the final dripping takes place, then they are carried upward and moved through the chamber 19 where the baking process begins. After being heated for a period while passing through this compartment, they pass upward into the uppermost compartment 18 at the top of the oven, and as they are traveling rearwardly through this compartment the baking process is completed. Then they leave this compartment and are carried downward along the rear wall of the oven and forwardly along the lowermost compartment 22. In traveling along this path the articles are gradually cooled as is desirable to produce the best results after being highly heated during the baking process. Then they are carried out of the oven downwardly, rearwardly, again downwardly to the lower trackway where they are either removed or allowed to again traverse the course just described, in which event, as they pass over the second tank 53, the latter will be repeatedly elevated and lowered, so as to immerse the previously-coated articles in the solution which provides the second coat. Then as they pass slowly along the line of travel in the manner previously described, the solution drips from the articles, they are gradually heated and then baked, then gradually cooled until they pass along the lowermost trackway 15, where they are removed and replaced with new or uncoated articles. Of course if they are to be given a third or even a fourth coat, they will be passed the third or fourth time around the course before being removed, being immersed in the japan on each trip.

This apparatus is highly efficient in the respect that excellent japanning results are obtained; at the same time the apparatus has an exceedingly great capacity inasmuch as it is capable of handling at one time a vast number of articles to be coated and the process is carried on uninterruptedly. Additionally, for an apparatus of given capacity, the hand labor required is very much less than that required by the most efficient machine of which I am aware used at the present time.

As previously stated, the dipping or immersing part of the apparatus is of great importance, especially as I am enabled to time the extent and period of immersion to a nicety. A further advantage lies in the fact that by bringing the receptacle or tank upwardly so as to immerse the articles from beneath in the manner herein described, hollow articles, such as bow sockets, will not be coated on the interior to any material extent, this being an important feature in the japanning of bow sockets.

The words "japan" or "japanning" are used in the specification in a broad sense and are intended to include enameling or other coating.

Having thus described my invention, what I claim, is:

1. In an apparatus of the character described, an oven, a conveyer for conveying articles to be japanned, the oven having a series of compartments, supports for the conveyer whereby the conveyer travels back and forth and upwardly through the different compartments of the oven and then downwardly through the oven from the uppermost compartment, and out from the oven through the lower part thereof.

2. In an apparatus of the character described, an oven having a plurality of compartments, one arranged above the other, a loading and unloading platform beneath the oven, a conveyer, means between the loading point and the oven for catching the solution which drips from the articles, and supports for the conveyer whereby the latter is caused to travel along the loading and unloading platform, over the drip catching means, and back and forth through the oven.

3. In an apparatus of the character described, an oven having compartments arranged one over the other, means for heating the oven so that the compartments will have varying degrees of temperature, an inclined drip catching wall extending from the oven downwardly, and an endless conveyer for the articles, having portions which travel, over the drip catching wall and back and forth through compartments of the oven in which the articles are caused to be heated to gradually increasing temperatures.

4. In an apparatus of the character described, an oven having a plurality of horizontally disposed compartments arranged one above the other, an endless conveyer for conveying the articles to be japanned, and a support for the conveyer by which the latter is caused to travel back and forth through several compartments of the oven, then downwardly from the uppermost compartment to the lowermost compartment, through the lowermost compartment and then out from the oven.

5. In an apparatus of the character described, an oven having a plurality of horizontally disposed compartments arranged one above the other and heated to different temperatures, an endless conveyer for conveying the articles to be japanned, and supporting devices for the conveyer by which the latter is caused to travel back and forth through several compartments of the oven, then downwardly from the uppermost compartment to the lowermost compartment, through the lowermost compartment and then out from the oven.

6. In an apparatus of the character described, an oven having a plurality of horizontally disposed compartments arranged one above the other, an endless conveyer for conveying the articles to be japanned, and supporting devices for the conveyer by which the latter is caused to travel back and forth through several compartments of the oven, then downwardly from the uppermost compartment to the lowermost compartment, through the lowermost compartment and then out from the oven and inclined drip wall in advance of the oven, said conveyer conveying the articles along the drip wall before conveying them into the oven.

7. In an apparatus of the character described, a vertical structure including an oven having a plurality of superposed compartments, means for heating certain of the compartments, a loading and unloading platform beneath the oven, a series of horizontal tracks beneath the oven and through the several compartments thereof, an inclined track leading from the lowermost track upwardly to a compartment of the oven, a drip wall beneath said inclined track, and a conveyer for conveying the articles to be japanned over the platform, along the inclined track over the drip wall, then back and forth through certain compartments of the oven, then downwardly back and forth along certain tracks again to the loading and unloading platform.

8. In an apparatus of the character described, an oven and a conveyer for conveying through the oven articles which have been coated with a solution, said conveyer having portions which carry the articles back and forth across the oven along paths one above the other and then downward and out from the lower portion of the oven.

9. In an apparatus of the character described, an oven and a conveyer extending through the oven, and having portions which travel backward and forward in substantially horizontal planes, one above the other and then downward and out through the lower portion of the oven.

10. In an apparatus of the character described, an oven, a loading and unloading platform beneath the oven, an endless conveyer, and supports for the conveyer which cause the latter to travel over said platform and back and forth in substantially horizontal planes to the upper part of the oven and finally downward through the oven and out through the lower portion thereof to the platform.

11. In an apparatus of the character described, a drying oven, a loading and unloading platform beneath the oven, and an endless conveyer constructed and arranged so that articles to be dried are carried along said platform, then up into the side of the oven, then back and forth in the oven, and out through the lower portion of the oven to the platform.

12. In an apparatus of the character described, an oven, a loading and unloading platform below the oven, and a conveyer including endless chains and supports therefor so disposed that articles carried by the conveyer are moved along said platform, then up into the side of the lower portion of the oven, then back and forth in different horizontal planes to the top of the oven, and then down to the lower part of the oven and back to the platform.

13. In apparatus of the character described, an oven, a loading and unloading platform below the oven, and an endless conveyer having supports arranged so that the articles on the conveyer are carried along the platform, then into the side of the same near the bottom, then back and forth in horizontal planes one above the other, then down to the bottom and out through the side of the oven to said platform.

In testimony whereof, I hereunto affix my signature.

DAVID F. DOMIZI.